United States Patent
Dorrmann (10) Patent No.: US 11,203,142 B2
(45) Date of Patent: Dec. 21, 2021

(54) AUTOMATIC CHANGE OF BLOW MOULD

(71) Applicant: KRONES AG, Neutraubling (DE)

(72) Inventor: Beate Dorrmann, Worth an der Donau (DE)

(73) Assignee: KRONES AG, Neutraubling (DE)

( * ) Notice: Subject to any disclaimer, the term of this patent is extended or adjusted under 35 U.S.C. 154(b) by 43 days.

(21) Appl. No.: 16/635,031

(22) PCT Filed: Aug. 2, 2018

(86) PCT No.: PCT/EP2018/071004
§ 371 (c)(1),
(2) Date: Jan. 29, 2020

(87) PCT Pub. No.: WO2019/025547
PCT Pub. Date: Feb. 7, 2019

(65) Prior Publication Data
US 2020/0238589 A1    Jul. 30, 2020

(30) Foreign Application Priority Data

Aug. 2, 2017  (DE) ...................... 10 2017 117 533.4
Aug. 2, 2017  (DE) ...................... 10 2017 117 576.8
(Continued)

(51) Int. Cl.
B29C 49/46        (2006.01)
B29C 49/48        (2006.01)
(Continued)

(52) U.S. Cl.
CPC .......... B29C 49/4205 (2013.01); B29C 49/06 (2013.01); B29C 49/36 (2013.01);
(Continued)

(58) Field of Classification Search
CPC ........ B29C 49/4823; B29C 2049/4838; B29C 2049/4841; B29C 2049/4843; B29C 2049/4856; B29C 49/36
See application file for complete search history.

(56) References Cited

U.S. PATENT DOCUMENTS 5,234,637 A      8/1993  Reymann et al.
8,333,581 B2 *  12/2012  Langlois ............... B29C 33/306
                                                                       425/195
(Continued)

FOREIGN PATENT DOCUMENTS

DE          3832284         4/1990
DE       102009039699       4/2011
(Continued)

OTHER PUBLICATIONS

Partial machine translation of JP S 62-238730 A dated Oct. 1987 obtained from the espace website. (Year: 1987).*
(Continued)

*Primary Examiner* — Robert B Davis
(74) *Attorney, Agent, or Firm* — Onello & Mello, LLP (57) ABSTRACT

Apparatus (1) for transforming plastic preforms (10) to form plastic containers (20) with a plurality of blow moulding stations (8), wherein these blow moulding stations (8) each have a blow moulding device (14) which consists of two blow mould halves and a base mould, and wherein the blow moulding device in each case forms a cavity inside which the plastic preforms (10) can be transformed to form the plastic containers (20), and which is releasably arranged indirectly or directly on blow mould supports (16), wherein each blow moulding device has at least one temperature control device (30) with at least one electrical heating element (32) for temperature control of at least some regions of the blow moulding device (14). According to the invention the apparatus (1) has at least one electrical connection
(Continued)

(34) which can be automatically released and/or automatically made between at least one electrical heating element (32) and the blow moulding station (8).

19 Claims, 2 Drawing Sheets

(30) Foreign Application Priority Data

| Aug. 29, 2017 | (DE) | ................ | 10 2017 119 816.4 |
| Aug. 29, 2017 | (DE) | ................ | 10 2017 119 817.2 |
| Dec. 12, 2017 | (DE) | ................ | 10 2017 129 576.3 |

(51) Int. Cl.
*B29C 49/42* (2006.01)
*B29C 49/36* (2006.01)
*B29C 49/06* (2006.01)
*B29L 31/00* (2006.01)

(52) U.S. Cl.
CPC .......... *B29C 49/46* (2013.01); *B29C 49/4823* (2013.01); *B29C 49/48* (2013.01); *B29C 2049/4697* (2013.01); *B29C 2049/4841* (2013.01); *B29C 2049/4843* (2013.01); *B29C 2049/4856* (2013.01); *B29C 2049/4892* (2013.01); *B29L 2031/7158* (2013.01)

(56) References Cited

U.S. PATENT DOCUMENTS

| 8,550,803 | B2 | 10/2013 | Senn |
| 9,296,147 | B2 | 3/2016 | Le Pechour et al. |
| 9,409,341 | B2 | 8/2016 | Cirette et al. |
| 9,925,712 | B2 | 3/2018 | Finger et al. |
| 2010/0104681 | A1* | 4/2010 | Dagorn ............... B29C 49/4823 425/170 |
| 2011/0049742 | A1 | 3/2011 | Senn |
| 2011/0052744 | A1* | 3/2011 | Meinzinger ............ B29C 49/36 425/183 |
| 2014/0065256 | A1 | 3/2014 | Le Pechour et al. |
| 2014/0377394 | A1* | 12/2014 | Le Pechour ........... B29C 49/38 425/144 |
| 2015/0132430 | A1 | 5/2015 | Cirette et al. |
| 2015/0145179 | A1 | 5/2015 | Finger et al. |
| 2018/0104885 | A1* | 4/2018 | Alix ..................... B29C 49/063 |

FOREIGN PATENT DOCUMENTS

| DE | 102010006898 | | 8/2011 | |
| DE | 102013113076 | | 5/2015 | |
| EP | 2292405 | | 8/2011 | |
| EP | 2703146 | | 3/2014 | |
| JP | 62238730 A | * | 10/1987 | ......... B29C 49/4823 |
| WO | 2005025835 | | 3/2005 | |

OTHER PUBLICATIONS

German Search Report dated May 9, 2018 issued in corresponding German Application No. 102017117533.4.

International Search Report and Written Opinion dated Oct. 17, 2018 issued in corresponding International Application No. PCT/EP2018/071004.

* cited by examiner

AUTOMATIC CHANGE OF BLOW MOULD

The present invention relates to an apparatus and a method for transforming plastic preforms into plastic containers. Such apparatus and methods have been known for a long time from the prior art and have blow moulding devices in which the plastic preforms are expanded to form the plastic containers inter alia by application of a medium to them. Typically in this case not only the plastic preforms, before they are introduced into the blow mould devices, but also the blow moulding devices themselves are temperature-controlled, in order to offer the necessary framework conditions according to the type of process. In some types of process, for instance during the transforming of plastic preforms to form containers which are then filled with hot medium, mould temperatures between 70 and 160° C. are necessary.

In the apparatus and methods which are currently known from the prior art, blow moulds are typically temperature-controlled by liquid media such as water or oil. This gives rise to the disadvantage that, if media are to be heated far above 100° C., only oil is worth considering as temperature control medium. With regard to the automatic change of blow mould by means of a robot the liquid temperature control media have several disadvantages, since the couplings must be disconnected and connected in an elaborate manner. In this case on the one hand leakages and contaminations of the machine can occur, which should absolutely be avoided in particular when oil is used as temperature control medium. On the other hand the changing operation is disadvantageously slowed down, since the media couplings must be disconnected and connected manually if required. This may take some time if, on each mould half and on the base mould in each case, a feed flow and return flow must be coupled and uncoupled.

The object of the present invention is to overcome the disadvantages known from the prior art and to find a solution for configuring temperature-controlled blow moulds in particular also to be compatible for the automatic mould change.

The object is achieved according to the invention by the subjects of the independent claims. Advantageous embodiments and modifications of the invention are the subject of the subordinate claims.

An apparatus according to the invention for transforming plastic preforms into plastic containers has a plurality of blow moulding stations, wherein these blow moulding stations each have a blow moulding device which can preferably be temperature-controlled, which blow moulding devices preferably have two blow mould halves and a base mould, and particularly preferably consists of two blow mould halves and a base mould, and wherein the blow moulding device in each case forms a cavity inside which the plastic preforms can be transformed to form the plastic containers, and which is releasably arranged indirectly or directly on blow mould supports, wherein at least one blow moulding station, preferably each blow moulding station, and particularly preferably each blow moulding device has at least one temperature control device with at least one electrical heating element for temperature control of at least some regions or some portions of the blow moulding device.

According to the invention the apparatus has at least one automatically releasable and/or an automatically producible electrical connection between at least one electrical heating element and the blow moulding station (preferably the blow moulding device or the mould support shell or the blow mould support). For each blow moulding station, the apparatus has an automatically releasable and/or an automatically producible electrical connection between at least one electrical heating element and the respective blow moulding station. The invention is described below in relation to a blow moulding station. It goes without saying that each blow moulding station can be equipped with the described features.

Preferably at least one blow moulding station, particularly preferably each blow moulding station, has an electrical temperature control device. In this case the electrical temperature control device can be provided as the only temperature control device. However, it is also conceivable that this is provided in addition to or as assistance for at least one further temperature control device which is not electrically operated and which uses a liquid temperature control medium. The temperature control device preferably has at least one Peltier element. The advantage of a Peltier element is in particular that when such an element is used no additional temperature control medium is required which must be fed to the apparatus. The electrical heating element can preferably be designed (in each case) as an electrical heating rod. In this case the electrical temperature control device can preferably also have several electrical heating elements.

The temperature control device(s) provided according to the invention with at least one electrical heating element control the temperature of the (respective) blow moulding device (that is to say they heat and/or cool it) at least in portions at least indirectly and preferred directly. Thus the at least one electrical heating element can be in direct (physical) contact with the blow moulding device, although a purely thermal (or thermally producible) contact with the blow moulding device is preferably also sufficient. In other words one electrical heating element or the electrical heating elements can directly abut the blow moulding device and/or can be arranged on and/or in the blow moulding device.

In this case the term "automatic" should preferably be understood to mean that this takes place without (direct or immediate) action or intervention by an operator of the apparatus. That is to say that preferably there is no involvement of an operator of the apparatus who releases and/or makes the electrical connection(s) manually. Preferably the automatic breaking and/or automatic making of a connection is also not initiated (directly) by an operator, for instance in the sense that the operator actuates a switching element provided therefor. The automatic releasing and/or the automatic making of the electrical connection preferably takes place in a changing mode of the apparatus, in which at least one blow moulding device is changed, and which differs from an expansion mode, in which the plastic preforms are expanded to form plastic containers. Thus the automatic releasing and/or the automatic making of the electrical connection(s) preferably correlates (in terms of time) with a changing operation at least of one or the blow moulding device of the respective blow moulding station. Thus for example at the start of a change of a blow moulding device the automatic releasing of the electrical connection(s) can be triggered or initiated, for instance by transmission of a signal, and/or after the insertion or attachment of a new blow moulding device in a blow moulding station the automatic making of the electrical connection(s) can be triggered or initiated, for instance by transmission of a signal. The automatic releasing or the automatic making of the electrical connection(s) can preferably be triggered or initiated by an (electronic) signal which is transmitted by an enabling device of the apparatus. In this case the enabling device preferably monitors whether a change of blow moulding device should be enabled or carried out and/or preferably whether a blow moulding device to be newly inserted in the context of a change has been correctly arranged on the blow moulding station and the electrical connection(s) should be made again as a consequence.

The apparatus for transforming plastic preforms into plastic containers is preferably a blow moulding machine. This means that the plastic preforms are first of all thermally conditioned in a heating section and then are expanded by application of a liquid or gaseous medium. The flowable medium is preferably under pressure. For the delivery of the pressurised medium the apparatus has a blow moulding nozzle which can be placed onto a mouth of the plastic preforms to form a seal, in order thus to expand the plastic preforms with liquid or gaseous medium. In addition, a valve assembly is preferably also provided, which controls the delivery of the blowing air to the plastic preforms.

The blow moulding machine is preferably a stretch blow moulding machine, which means that before and/or during the expansion the preforms are expanded in the longitudinal direction by means of a stretching rod. In this case the blow moulding stations each have stretching rods, which can be introduced into the plastic preforms and expand the plastic preforms in their longitudinal direction. In this case the stretching rods preferably have an electrical drive.

In one advantageous embodiment a plurality of blow moulding stations are arranged on a common movable carrier. In this case this carrier is in particular a rotatable carrier. The blow moulding stations each have a blow moulding device preferably forming a hollow space inside which the plastic preforms can be expanded into the plastic containers. In this case these blow moulding devices are preferably formed in multiple parts and each have two blow mould halves and a base mould. These blow mould halves can preferably be releasably arranged on a mould support shell or on the blow mould supports. The blow mould supports are pivotable with respect to one another, in order to open and to close the blow moulding devices. Moreover, the blow mould support has locking mechanisms in order to lock the mould halves with respect to one another during the blow moulding process.

Particularly preferably, the blow moulding machine or the carrier and the blow moulding arrangements are arranged inside a clean room which demarcates the blow moulding machine relative to an unsterile environment. In this case, driving devices for the closing, locking and/or opening of the blow moulds are preferably arranged outside the clean room.

The blow mould devices are preferably transported inside the clean room. The clean room is preferably delimited by several walls. In this case the clean room is delimited by at least one stationary wall and a wall which is movable relative to this stationary wall. The clean room demarcates the blow moulds in particular from an unsterile environment. The clean room is advantageously formed in an annular or toroidal manner around the blow moulding stations or transforming stations and/or the transport path of the plastic containers.

The apparatus preferably has a slip ring transmitter, which particularly preferably introduces all the electrical power into the rotating part of the apparatus. Preferably, at the same time, by an automatic releasing or automatic making of the electrical connection(s) an electrical connection between the respective heating element and the electrical power supply of the rotating part of the system or of the rotatable support or of the slip ring transmitter is released or made. Furthermore, the apparatus preferably has a rotary distributor for cooling medium.

In the event of a change of the blow moulding device or the blow mould halves and/or the base mould, the blow mould supports and the mould support shell preferably remain on the apparatus. In the event of a change of the blow moulding device, the temperature control device provided for controlling the temperature of the blow moulding device preferably remains on the apparatus. However, the temperature control device can also be replaced at least partially together with at least one part of the blow moulding device, for instance a blow mould half.

In an advantageous embodiment the blow mould devices are preferably arranged on the blow mould supports by means of mould support shells.

In a further advantageous embodiment a respective latching device is provided on each blow mould half, and fastens the blow moulding device releasably to the mould support shell or to the blow mould support.

In a further advantageous embodiment the apparatus has at least one triggering device which is suitable and intended to release an automatic breaking and/or an automatic making of an electrical connection between the at least one electrical heating element and the transforming station. In this case the triggering device engages in at least one element of the blow moulding station or the blow moulding device and/or the mould support shell and/or the blow mould support.

In a further advantageous embodiment, as a triggering device (at least) one changing device is provided, which is suitable and intended (preferably selectively) to change the complete blow moulding device (or only parts of the blow moulding device, in particular only the blow mould halves and/or only the base mould) in particular automatically, in particular to remove it from the blow mould support and/or to arrange a blow moulding device on the blow mould supports. Thus, in other words, not only does the changing device preferably carry out the changing of at least one blow mould half or base mould, but in terms of time before and/or during and/or after this changing it likewise carries out a releasing of the electrical connection(s) between the at least one electrical heating element and the blow moulding station. The changing device is (also) preferably suitable and intended to disconnect and/or to connect at least one or all coupling device(s) for media from or to a predetermined blow moulding station.

The use of (at least) one changing device is advantageous in particular when frequent changes of blow mould devices must be carried out. The changing device is preferably a semi-automatic and preferably fully automatic robot. However, a manual changing device may also be provided. Thus it would be possible for example that a so-called manipulator is used instead of a robot. A manipulator compensates for the dead weight of a workpiece to be moved, such as for instance a blow moulding device, in order to simplify the operation. The operator can guide the manipulator which has the mould gripper fastened on its end. Such a change by means of a manipulator is not automatically carried out or carried out without an operator. It is pointed out that the configuration of the changing device as a manipulator can also be used irrespective of whether the changing device also carries out other activities outside the changing mode.

In other words the changing device can preferably be a mobile device which can preferably be moved in its entirety, and it is preferably not a stationary device. The changing device is preferably suitable and intended to carry out not only the changing of a blow moulding device and/or the releasing and/or making of the electrical connection(s) between at least one heating element and the blow moulding station of a predetermined blow moulding station on the apparatus, and thus is not associated with precisely one blow moulding station, but is suitable and/or intended to carry this out at least also in a further blow moulding station and preferably in all blow moulding stations of the apparatus. However, it is also provided that several changing devices are provided, which for instance operate different blow moulding stations concurrently and which in particular separate and/or make the electrical connection(s) of the temperature control device (preferably concurrently, but conceivably also one after the other in time). This offers the advantage of a further saving of time.

Preferably the at least one changing device is used in the changing mode. Advantageously the changing device can likewise be arranged inside the clean room, particularly preferably not only in a changing mode but also in an expansion mode of the apparatus.

In a further advantageous embodiment the changing device has at least one gripping device for gripping the blow mould device, wherein the gripping device is suitable for selectively changing a complete blow moulding device or only parts of the blow moulding device. The gripping device is preferably arranged on the changing device in such a way that it is pivotable about several axes. The gripping device can preferably be connected positively and/or non-positively to the blow mould device or to at least one blow mould half and preferably the two blow mould halves and/or the base mould.

In a further advantageous embodiment the releasing and/or making of the electrical connection takes place by at least one gripping device of the changing device. The gripping device is preferably suitable and intended, by actuation of at least one switching element, to make and/or to release the electrical connection between the at least one heating element and the blow moulding station, and preferably the blow moulding device. The robot or the changing device is preferably suitable and intended to release the (preferably all) electrical connection(s) (between the heating elements and the blow moulding station or preferably the blow moulding device), preferably with its gripping device.

In a further advantageous embodiment the blow moulding device is removed in its entirety and placed in a magazine, wherein the blow mould halves and the base mould in this state are releasably fastened to one another. The term "entirety" is preferably understood to include the two blow mould halves and the base mould. Thus in other words all three parts are fastened to one another. The changing device is preferably suitable and intended to remove the blow moulding device in its entirety (from the blow moulding station) and to place it in a magazine, wherein the blow mould halves and the base mould in this state are releasably fastened to one another.

In a further advantageous embodiment the changing device is suitable and intended to release and/or make the electrical connection(s) between the at least one heating element and the blow moulding station, in terms of time, before, during or after the gripping of the blow moulding device, but preferably still during an individual changing operation of a blow moulding device or a part of a blow moulding device. The blow mould devices are preferably received as a mould set, consisting of the base mould and the two blow mould halves.

In a further advantageous embodiment the changing device carries out the releasing and/or the making of the electrical connection(s) substantially concurrent with the changing of at least a part of the blow moulding device. This offers the advantage that for instance a robot can also grip hot blow mould devices. It is conceivable that for this purpose the changing device also has more than one gripping device. The changing device carries out the releasing and/or the making of the electrical connection(s) between at least one heating element and the blow moulding station concurrently with the changing of a blow mould half, preferably by the same method step. For example an electrical connection or an electrical contact can already be interrupted or made by the removal and/or the insertion of a blow mould half.

In a further advantageous embodiment the releasing of the at least one electrical connection takes place by the removal of at least a part of the blow moulding device and/or the making of the at least one electrical connection by the insertion of at least a part of a blow moulding device.

In a further advantageous embodiment the releasing and/or the making of the at least one electrical connection takes place by, in particular, automatic lifting and/or lowering of the blow moulding device, preferably at least one blow mould half and/or the base mould.

In a further advantageous embodiment the releasing of the at least one electrical connection takes place by the insertion and removal of a plug element of an (electrical) plug connection preferably arranged on and/or outside the blow moulding device. A counterpart piece of this plug element is preferably arranged on the mould support shell or on the blow mould support, preferably in the vicinity of the blow moulding nozzle. Each blow mould half (and/or the base mould) preferably has at least one and preferably precisely one plug element. However, it is also conceivable that only one electrical plug connection is provided between the blow moulding device and the (rest of the) blow moulding station or the mould support shell or the blow mould support. In this case it is likewise conceivable that a preferably automatically releasable electrical (plug) connection is provided between two blow mould halves. It is likewise conceivable that a preferably automatically releasable electrical (plug) connection is provided between the base mould and at least one blow mould half. The (preferably each) plug connection or the (preferably each) plug element and/or the (preferably each) counterpart piece of this plug element preferably also has in addition to (at least) one electrical connection at least one feed flow and/or return flow for an (additional cooling medium) or a connector for a feed flow and/or return flow for an (additional) cooling medium. This additional cooling medium can advantageously be used in order to protect sensitive parts of the blow moulding station against overheating.

In a further advantageous embodiment the triggering device has at least one element which is selected from a group including an adjustment element, a pneumatic cylinder, a positionable cam and/or combinations thereof. This triggering device preferably engages mechanically in at least one element of the blow moulding device. A movement, for instance a lifting and/or a lowering, of at least a part of the blow moulding device, preferably the two blow mould halves and/or the base mould, can be effected or triggered by this mechanical engagement.

Thus the electrical connection or the electrical connections can preferably be released by an automatically triggered movement of the blow moulding device and/or by a gripping device of the robot and/or by insertion and removal of the blow moulding devices, for instance by means of plug connections.

In a further advantageous embodiment the apparatus has a conditioning device for thermal conditioning and in particular for cooling of at least one blow mould support and/or the blow moulding device, so that preferably a pressure pad seal does not exceed a predetermined temperature or does not become hot. Such a conditioning device is preferably provided as a safety mechanism so that the moulds are first cooled before an operator touches them. This is in particular highly relevant when a change of blow mould takes place manually.

In a further advantageous embodiment the apparatus has a temperature measuring device for detection of a value which is characteristic for the temperature (of the blow moulding station) preferably of the blow moulding device (for instance a blow mould half and/or the base mould) and/or the mould support shell. The automatic releasing and/or the automatic making of the electrical connection(s) preferably takes place having regard to the characteristic value detected by the temperature measuring device. Preferably, however, only the automatic releasing, but not the automatic making, of the electrical connection(s) takes place having regard to the characteristic value detected by the temperature measuring device. An (initialisation) signal is preferably transmitted to the triggering device as soon as the characteristic value detected by the temperature measuring device undershoots a predetermined maximum value. The triggering device is preferably suitable and intended to carry out the automatic releasing of the electrical connection(s) in response to this signal.

In a further advantageous embodiment the apparatus has a temperature control device for regulating the temperature having regard to the (characteristic) value detected by the temperature measuring device. This temperature control is preferably likewise automatically triggered, preferably as soon as the apparatus is in a changing mode or as soon as such a mode is activated. The temperature control device preferably performs a temperature control, particularly preferably also by means of cooling for example of the blow mould supports, until a predetermined value which is characteristic for the temperature of the blow moulding device undershoots a predetermined value.

Furthermore, the present invention is directed to a method for changing a blow moulding device of a blow moulding station of an apparatus for transforming plastic preforms into plastic containers, wherein the blow moulding device forms a cavity inside which the plastic preforms can be transformed to form the plastic containers, and wherein the blow moulding device (which can preferably be temperature-controlled) (preferred by means of blow mould support shells) is preferably arranged indirectly or directly releasably on blow mould supports, wherein (at least) one temperature control device, with at least one electrical heating element for temperature control of at least some regions of the blow moulding device, is preferably provided in at least one and in particular in each blow moulding station and particularly preferably in or on each blow moulding device.

According to the invention at least one electrical connection between at least one electrical heating element and the blow moulding station is automatically released and/or automatically produced. Thus in the context of the method according to the invention it is proposed that the electrical connection is not released (manually) by an operator or a releasing or making of the electrical connection must be triggered by the operator, but that such a releasing or making of the connection is carried out automatically and for instance is correlated with a predetermined changing step of the blow moulding device.

In an advantageous embodiment a triggering device releases and/or makes the electrical connection automatically in a changing mode of the apparatus. A control device is preferably provided. The electrical heating elements are preferably connected to the control device of the blow moulding machine.

Furthermore, the present invention is directed to an apparatus for transforming plastic preforms into plastic containers with a plurality of blow moulding stations, wherein these blow moulding stations each have a blow moulding device which in each case forms a cavity inside which the plastic preforms can be transformed to form the plastic containers, and which is arranged on the blow mould supports by means of mould support shells, wherein a changing device is provided, which is suitable and intended (preferably selectively) to change the complete blow moulding device (or only parts of the blow moulding device) in particular automatically, in particular to remove it from the blow mould support and/or to arrange a blow moulding device on the blow mould supports.

According to the invention the apparatus has a temperature control device with at least one electrical heating element for at least indirect temperature control of at least some regions of the blow moulding device. In this case the apparatus can be provided with all features in connection with the apparatus described above individually or in combination and vice versa.

The temperature control device preferably has a plurality of heating elements which are arranged in the (respective) blow moulding station and which can preferably be configured as heating rods. The temperature control device or the electrical heating rods is/are suitable and intended for controlling the temperature of the blow moulding device, at least in some regions, and preferably the inner wall thereof (the wall located in the direction of the cavity), particularly preferably to temperatures of at least 70° C., preferably at least 80° C. and particularly preferably at least 100° C. In this case the heating rods or the electrical heating elements can be arranged substantially perpendicularly (that is to say parallel to a longitudinal axis of the plastic preforms to be introduced into the blow moulding device) (in the blow moulding station). Furthermore, the electrical heating elements are preferably arranged equidistantly (viewed in the peripheral direction of the blow moulding station). However, it is also conceivable that the individual electrical heating elements are arrange in the manner of a heating loop, which extends for instance in the manner of a spiral from one side of a blow mould half or a blow moulding station to another side of a blow mould half or a blow moulding station. Each blow mould half of the blow moulding station preferably has the same number of electrical heating elements and particularly preferably these are arranged symmetrically (particularly preferably in mirror symmetry) with respect to one another. This offers the advantage that both sides of a plastic preform or of the resulting plastic container can be temperature-controlled in the same way.

In an advantageous embodiment the at least one electrical heating element is arranged on the blow moulding station and remains on the blow moulding station during changing of the blow moulding device. The at least one electrical heating element is arranged on the blow moulding station permanently with regard to a change of a blow moulding device, i.e. preferably on an element which remains permanently on the blow moulding station during a change of the blow moulding device. This offers the advantage that the heating element or the temperature control device can remain in the blow moulding station and for instance in the event of a change of blow mould no electrical connection of the electrical temperature control device to the current source has to be released. Furthermore, as a result this makes possible a less complex construction of the blow mould devices (without electrical heating element) which have to be adapted to the containers to be produced. Therefore at least one blow mould half and/or the base mould and preferably both blow mould halves has/have no electrical heating element or parts of the (electrical) temperature control device.

In a further advantageous embodiment the (electrical) temperature control device is arranged at least partially on at least a part of the blow moulding device and/or at least partially inside at least a part of the blow moulding device. The electrical temperature control device (or at least one electrical heating element) is arranged in at least one blow mould half and particularly preferably in each case an electrical temperature control device (or at least one electrical heating element) is arranged at least partially in both blow mould halves (and/or the base mould). This offers the advantage that the temperature control device is in each case arranged as close as possible to the wall/surface of the blow moulding device to be temperature controlled.

In a further advantageous embodiment the blow moulding device, in particular at least one blow mould half of the blow moulding device and preferably both blow mould halves of the blow moulding device in each case, has/have the at least one electrical heating element and preferably all electrical heating elements respectively belonging to the temperature control device (the blow mould half).

In a further advantageous embodiment the mould support shell has the at least one electrical heating element and preferably all electrical heating elements belonging to the temperature control device. The electrical heating element or the electrical heating elements is/are preferably arranged in the interior of the mould support shell. However, it is also conceivable that for instance a part of the temperature control device is arranged in the mould support shell and a further part of the temperature control device is arranged in the blow moulding device. Thus for instance a fine adjustment of the temperature control can take place by electrical heating elements arranged in the blow moulding device.

The mould support shell and/or the blow mould support preferably has at least one isolating element which preferably isolates an electrical connection or an electrical contact relative to at least one further element of the apparatus.

In a further advantageous embodiment at least one electrical contact, by means of which the electrical heating element can be operated or by means of which the electrical heating element can be connected to a current source or can be attached to a current source, is arranged on the mould support shell. The electrical connection can preferably be released on this electrical contact. In this case the electrical connection can be released (for instance also manually) by an operator of the apparatus. In this case the electrical contact can be arranged for instance on an upper side of the mould support shell or on the upper side of a blow mould support.

In a further advantageous embodiment at least one electrical contact, by means of which the electrical heating element can be connected to a current source or can be attached to a current source or can be operated, is arranged on the blow mould support. The electrical connection can preferably be released on this electrical contact. In this case the electrical connection can be released (for instance also manually) by an operator of the apparatus.

In a further advantageous embodiment the changing device has at least one gripping device for gripping the blow mould device, wherein the gripping device is suitable for (preferably selectively) changing a complete blow moulding device (or only parts of the blow moulding device). The gripping device can preferably be connected positively and/or non-positively to the blow mould device. The releasing and/or making of the electrical connection preferably takes place by at least one gripping device of the changing device.

In a further advantageous embodiment the blow moulding device is removed in its entirety from the blow moulding station and, in a preferably assembled state, placed in a magazine. The changing device is preferably suitable and intended to remove the blow moulding device in its entirety from the blow moulding station and to place it in a preferably assembled state in a magazine.

In a further advantageous embodiment the apparatus has a control device which initiates or triggers an interruption and/or making of an electrical connection between the at least one electrical heating element and an electrical contact in the blow moulding station, preferably in a changing mode of the apparatus, wherein the interruption and/or the making of the electrical connection preferably takes place concurrently with a change of the blow moulding device or concurrently with a change of at least one part of the blow moulding device, for instance a blow mould half. The control device preferably initiates such an interruption and/or making of a connection as a function of whether the machine is in a changing mode or in an expansion mode in which the containers are expanded. The control device preferably performs such an initiation or triggering as soon as the apparatus changes to a changing mode. The control device preferably carries out an interruption and/or making of an electrical connection by switching the temperature control device off or on. This preferably takes place without (physically or mechanically) releasing or making an electrical connection in the blow moulding station and/or in the blow moulding device and/or in the mould support shell. The heating elements are preferably switched off (automatically), particularly preferably by means of the control device, when the changing operation takes place or when the apparatus is in the changing mode and advantageously when the apparatus changes into the changing mode.

The at least one electrical heating element or (all of) the electrical heating elements or the temperature control device is/are preferably connected to the control device of the blow moulding machine.

In a further advantageous embodiment the temperature control device has at least one (electrical) plug connection, by means of which or on which an electrical connection between the at least one electrical heating element and an electrical contact in the blow moulding station can be interrupted (physically or mechanically), in particular can be released and/or can be made. In this case the plug connection may be configured as a purely electrical plug connection, by means of which exclusively an electrical connection can be released and/or made. However, it is also conceivable that the plug connection also has, in addition to the electrical connector, a further media connection or a further media coupling device or further media connections or media coupling devices, which can likewise be disconnected by releasing of the plug connection. Furthermore, the plug connection can be arranged in the vicinity of or alongside or adjacent to further media coupling devices or media connection devices of the blow moulding device or the mould support shell. Moreover, the blow moulding device preferably has conduits for heat transfer media such as heat transfer liquids, the feed conduits and/or discharge conduits thereof are (must be) likewise coupled and/or uncoupled. A coupling and/or uncoupling preferably takes place by the changing device, particularly preferably concurrently or at least promptly by the releasing and/or making and/or interruption of the electrical connection.

In a further advantageous embodiment the releasing of the at least one electrical connection takes place by the insertion and removal of at least one plug element of a plug connection preferably arranged on and/or outside the blow moulding device.

In a further advantageous embodiment the plug element contains an electrical connecting conduit as well as a feed flow and a return flow for a cooling medium. Particularly preferably in a changing mode of the apparatus, this cooling medium is preferably used for cooling the blow moulding station, in particular also the blow mould support, in order advantageously to avoid a potentially combustion risk for a user or operator.

Furthermore, the present invention is directed to a method for changing a blow moulding device of a blow moulding station of an apparatus for transforming plastic preforms into plastic containers, wherein the blow moulding device in each case forms a cavity inside which the plastic preforms can be transformed to form the plastic containers, and is arranged on blow mould supports, wherein a changing device preferably selectively changes the complete blow moulding device or only parts of the blow moulding device in particular automatically, in particular removes it from the blow mould support thereof and/or arranges a blow moulding device on the blow mould supports.

According to the invention a temperature control of at least a part of the blow moulding device, preferably the two blow mould halves of the blow moulding device, takes place at least partially by means of at least one electrical heating element.

In an advantageous embodiment the heat output of the at least one electrical heating element, preferably in a changing mode, is controlled or switched off.

Further advantages and embodiments are apparent from the appended drawings.

Figure 1:
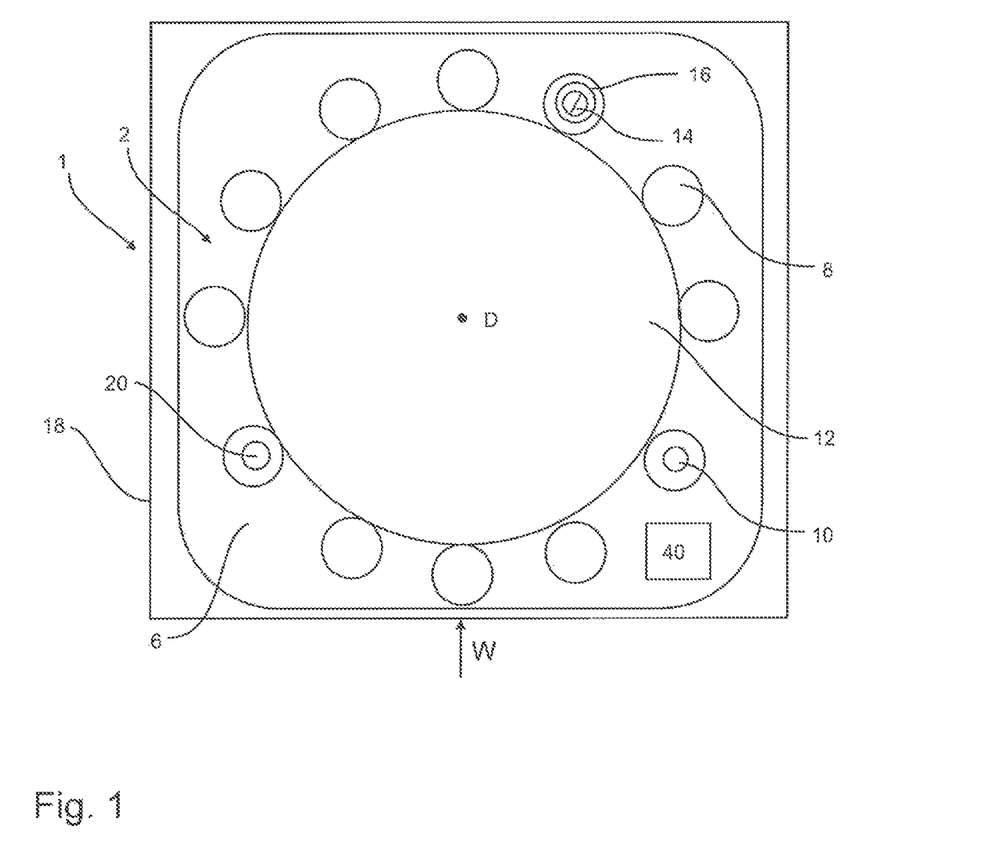
FIG. 1 shows a schematic representation of an apparatus according to the invention.

FIG. 1 shows a schematic representation of an apparatus 1 for transforming plastic preforms 10 into plastic containers 20. In this case the plastic preforms 10 are fed to the individual blow moulding stations 8 and are expanded to form plastic containers 20, preferably while they are being transported by a transport device 2. After this expansion the plastic containers 20 are removed from the apparatus 1 again. For this purpose a feed starwheel can be provided which delivers the plastic parisons to the apparatus 1 and also a discharge device, in particular likewise a transport starwheel, which discharges the finished containers 20 from the apparatus 1. The apparatus 1 has a (station) carrier 12 on which a plurality of blow moulding stations 8 are arranged. In this case this carrier 12 may be for example, as shown in FIG. 1, a blow moulding wheel which is rotatable with respect to an axis of rotation D (which here extends perpendicular to the drawing plane and thus vertically). In this case each individual blow moulding station 8 has a respective blow mould device 14. This blow mould device 14 is composed of two blow mould halves and a base part. These blow mould devices can be changed, preferably by a changing device. In this case the blow mould devices 14 are arranged on blow mould supports 16 and can be removed therefrom or arranged thereon.

The reference 40 identifies a changing device which serves to remove the blow mould devices from their blow mould supports or to dispose the blow mould devices on the blow mould supports. The reference 6 identifies a base carrier on which the station carrier 12 is rotatably mounted. The changing device 40 is also arranged on or adjacent to the base carrier 6. Thus the changing device 40 can be integrated in the apparatus. However, the changing device 40 can likewise also be arranged outside the apparatus, for example before the change position W, and can engage from the exterior in the blow moulding wheel.

The reference W designates a changing position. As mentioned above, the blow moulding devices are preferably replaced at a specific changing position. This means that the blow moulding stations 8 can be moved successively into this changing position W by a rotation of the carrier 12, and then in this changing position the old blow moulding devices can be removed and preferably new blow moulding devices can also be delivered. The reference R designates a radial direction. In this radial direction the changing device or a gripping device of the changing device is preferably advanced to the blow moulding stations 8 or the blow moulding devices in order to change them.

Figure 2:
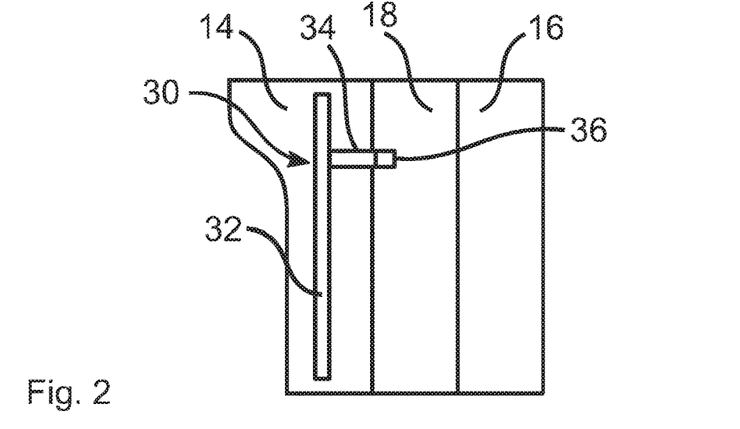
FIG. 2 shows a schematic detail of an embodiment of an apparatus according to the invention.

FIG. 2 shows a schematic detail of an embodiment of an apparatus 1 according to the invention. The reference numeral 14 designates a blow moulding device or a blow mould half of a blow moulding device. In this embodiment an electrical heating element 32 which is connected by means of an electrical connection 34 to an electrical contact 36 is arranged inside the blow mould half itself. In the illustrated embodiment the electrical contact 36 is arranged in the mould support shell 18 of the blow moulding station. By means of this electrical contact 36 the electrical heating element 32 can be connected to an electrical current supply. The mould support shell 18 is in turn arranged on the blow mould support 16. It is shown that the electrical connection 34 can be configured for instance as a plug connection and thus can be plugged in and unplugged in a simple manner directly during insertion and removal of the blow mould. In this case several heating elements 32 or heating rods can be provided, which can be arranged for instance with substantially equidistant spacing (viewed in the peripheral direction of the blow moulding device). Thus in the variant shown here the heating rods or the electrical heating elements are located directly in the blow moulding device. The production of an electrical connection then takes place for example by the insertion of the mould or of a part of the blow moulding device 14 into the mould support shell 18 or the blow mould support 16. The breaking of the connection takes place in turn by the removal of the mould.

Figure 3:
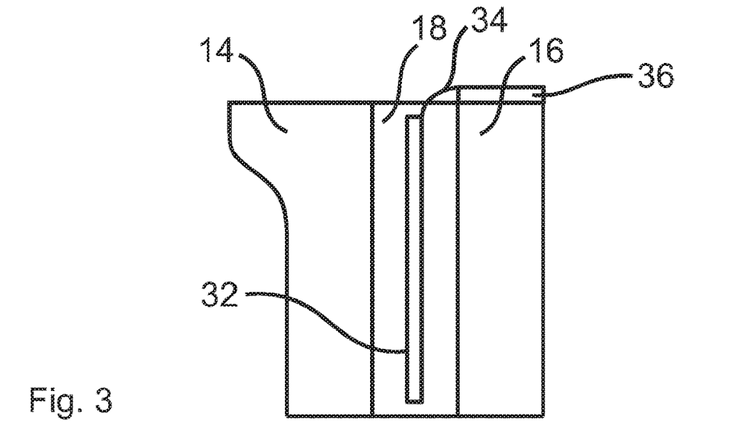
FIG. 3 shows a schematic detail of a further embodiment of an apparatus according to the invention.
Figure 4:
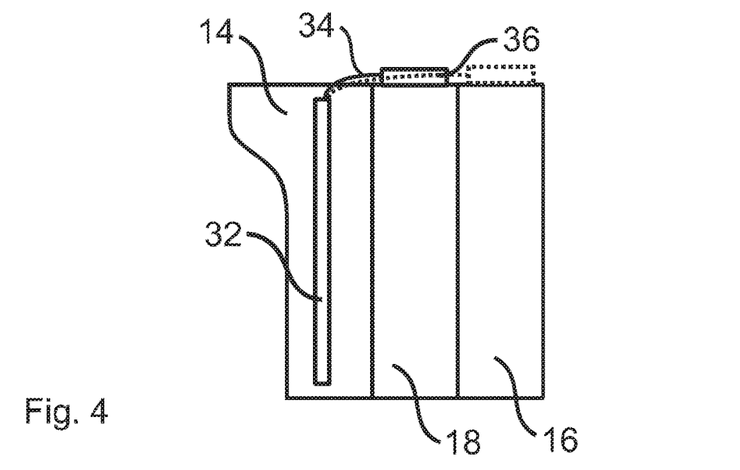
FIG. 4 shows a schematic detail of a further embodiment of an apparatus according to the invention.

FIGS. 3 and 4 show schematic representations of details of modified embodiments of the embodiment shown in FIG. 2 of an apparatus 1 according to the invention. In this case in FIG. 3 the temperature control device 30 or the electrical heating element 32 is arranged in the mould support shell 18, and the electrical contact 36 is arranged on the blow mould support 16. In the illustrated embodiment the temperature control device 30 merely controls the temperature of the blow moulding device indirectly, as it controls the temperature of the mould support shell 18 and, by means of the temperature control of the mould support shell 18, brings about temperature control of the blow moulding device 14. Thus in this variant the heating rods are located directly in the mould support shell 18. Here the making or breaking of an electrical connection 34 by plugging in and unplugging a plug outside the mould or the blow moulding device 14 is possible. In this case the plug can comprise an electrical connection 34, as well as a feed flow and/or return flow for an additional cooling medium.

In FIG. 4 the electrical heating element 32 of the temperature control device 30 is in turn arranged in a blow mould half of the blow moulding device 14. In the illustrated embodiment the electrical contact 36, to which the electrical heating element 32 is connectable by means of the electrical connection 34, is arranged on the upper side of the mould support shell 18 and thus outside the blow moulding device 14. For example, this electrical contact can also be arranged preferably on the upper side of the blow mould support(s) 16 (shown by broken lines line).

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 transport device
6 base carrier
8 blow moulding station
10 plastic preform
12 station carrier
14 blow moulding device
16 blow mould support
18 mould support shell
20 plastic container
30 temperature control device
32 electrical heating element
34 electrical connection
36 electrical contact
40 changing device
D axis of rotation
W change position

The invention claimed is:

1. Apparatus for transforming plastic preforms into plastic containers with a plurality of blow moulding stations, wherein these blow moulding stations each have a blow moulding device which consists of two blow mould halves and a base mould, and wherein the blow moulding device in each case forms a cavity inside which the plastic preforms can be transformed to form the plastic containers, and which is releasably arranged indirectly or directly on blow mould supports, wherein each blow moulding device has at least one temperature control device with at least one electrical heating element for temperature control of at least some regions of the blow moulding device, characterised in that the apparatus has at least one electrical connection which can be automatically released and/or automatically made between at least one electrical heating element and the blow moulding station wherein the apparatus has at least one triggering device which is suitable and intended to produce an automatic releasing and/or an automatic making of an electrical connection between the at least one electrical heating element and the blow moulding station, wherein as a triggering device at least one changing device is provided, which is suitable and intended to change the complete blow moulding device or only parts of the blow moulding device, wherein the at least one changing device is a semi-automatic or fully automatic robot.

2. Apparatus according to claim 1, characterised in that the blow moulding devices are preferably arranged on the blow mould supports by means of mould support shells.

3. Apparatus according to claim 2, characterised in that a respective latching device is provided on each blow mould half, and fastens the blow moulding device releasably to the mould support shell or to the blow mould support.

4. Apparatus according to claim 1, characterised in that as triggering device a changing device is provided, which is suitable and intended to change the complete blow moulding device.

5. Apparatus according to claim 1, characterised in that the blow moulding device is removed in its entirety and placed in a magazine, wherein the blow mould halves and the base mould in this state are releasably fastened to one another.

6. Apparatus according to claim 4, characterised in that the changing device carries out the releasing and/or the making of the electrical connection substantially concurrently with the changing of at least a part of the blow moulding device.

7. Apparatus according to claim 4, characterised in that the changing device has at least one gripping device for gripping the blow moulding device, wherein the gripping device is suitable for selectively changing a complete blow moulding device or only parts of the blow moulding device.

8. Apparatus according claim 7, characterised in that the releasing and/or making of the electrical connection takes place by at least one gripping device of the changing device.

9. Apparatus according to claim 1, characterised in that the releasing and/or making of the at least one electrical connection take place by automatic lifting and/or lowering of the blow moulding device.

10. Apparatus according to claim 1, characterised in that the releasing of the at least one electrical connection takes place by the removal of at least a part of the blow moulding device and/or the making of the at least one electrical connection by the insertion of at least a part of a blow moulding device.

11. Apparatus according to claim 1, characterised in that the releasing of the at least one electrical connection takes place by the insertion and removal of a plug element of a plug connection preferably arranged on and/or outside the blow moulding device.

12. Apparatus according to claim 1, characterised in that the triggering device has at least one element which is selected from a group including an adjustment element, a pneumatic cylinder, a positionable cam or combinations thereof.

13. Apparatus according to claim 1, characterised in that the apparatus has a conditioning device for thermal conditioning.

14. Apparatus according to claim 1, characterised in that the apparatus has a temperature measuring device for detecting a value which is characteristic for the temperature of the blow moulding device.

15. Apparatus according to claim 14, characterised in that the apparatus has a temperature control device for regulating the temperature with regard to the value detected by the temperature measuring device.

16. Method for changing a blow moulding device of a blow moulding station of an apparatus for transforming plastic preforms into plastic containers, wherein the blow moulding device is formed of two blow mould halves and a base mould and the blow moulding device forms a cavity inside which the plastic preforms can be transformed to form the plastic containers, and wherein the blow moulding device is arranged releasably indirectly or directly on blow mould supports, wherein at least one temperature control device with at least one electrical heating element for temperature control of at least some regions of the blow moulding device is provided, characterised in that at least one electrical connection between at least one electrical heating element and the blow moulding station is automatically released and/or automatically made, wherein a triggering device automatically releases and/or makes the electrical connection in a changing mode of the apparatus, wherein as a triggering device at least one changing device is provided, which is suitable and intended to change the complete blow moulding device or only parts of the blow moulding device, wherein the at least one changing device is a semi-automatic or fully automatic robot.

17. Apparatus according to claim 6, characterised in that the changing device has at least one gripping device for gripping the blow moulding device, wherein the gripping device is suitable for selectively changing a complete blow moulding device or only parts of the blow moulding device.

18. Apparatus according claim 17, characterised in that the releasing and/or making of the electrical connection takes place by at least one gripping device of the changing device.

19. Apparatus for transforming plastic preforms into plastic containers with a plurality of blow moulding stations, wherein these blow moulding stations have a blow moulding device which consists of two blow mould halves and a base mould, and wherein the blow moulding device in each case forms a cavity inside which the plastic preforms can be transformed to form the plastic containers, and which is releasably arranged indirectly or directly on blow mould supports, wherein each blow moulding device has at least one temperature control device with at least one electrical heating element for temperature control of at least some regions of the blow moulding device, characterised in that the apparatus has at least one electrical connection which can be automatically released and/or automatically made between at least one electrical heating element and the blow moulding station, wherein the releasing and/or making of the at least one electrical connection take place by automatic lifting and/or lowering of the base mould.

* * * * *